(12) United States Patent
Zhang

(10) Patent No.: US 10,067,366 B2
(45) Date of Patent: Sep. 4, 2018

(54) FULL LAMINATION STRUCTURE OF A LIQUID CRYSTAL MOLECULE

(71) Applicant: Shenzhen China Star Optoelectronics Technology Co., Ltd., Shenzhen, Guangdong (CN)

(72) Inventor: Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 356 days.

(21) Appl. No.: 14/422,354

(22) PCT Filed: Jan. 6, 2015

(86) PCT No.: PCT/CN2015/070231
§ 371 (c)(1),
(2) Date: Feb. 19, 2015

(87) PCT Pub. No.: WO2016/090722
PCT Pub. Date: Jun. 16, 2016

(65) Prior Publication Data
US 2016/0342011 A1 Nov. 24, 2016

(30) Foreign Application Priority Data
Dec. 10, 2014 (CN) .......................... 2014 1 0758854

(51) Int. Cl.
*G02F 1/1333* (2006.01)
*G02F 1/1335* (2006.01)
(Continued)

(52) U.S. Cl.
CPC ....... *G02F 1/133308* (2013.01); *G02B 6/005* (2013.01); *G02B 6/0093* (2013.01); *G02F 1/0105* (2013.01); *G02F 1/133615* (2013.01); *G02B 6/0055* (2013.01); *G02B 6/0088* (2013.01); *G02F 1/1333* (2013.01);
(Continued)

(58) Field of Classification Search
CPC ......... G02F 1/133308; G02F 1/133606; G02B 6/0093
See application file for complete search history.

(56) References Cited

U.S. PATENT DOCUMENTS 7,950,784 B2 * 5/2011 Silverbrook ......... B41J 2/17509
347/84
8,928,840 B2 * 1/2015 Kuo .................. G02F 1/133308
349/64
(Continued)

FOREIGN PATENT DOCUMENTS

CN 201661999 U 12/2010
CN 102062972 A 5/2011

*Primary Examiner* — Dung Nguyen
(74) *Attorney, Agent, or Firm* — Andrew C. Cheng

(57) ABSTRACT

A full lamination structure for a liquid crystal module comprises a housing, a liquid crystal panel overlapping on the housing, a light guide plate disposed in the housing, a plurality of optical films disposed in the housing, the plurality of optical films stacked on the light guide plate; and a buffer layer and an optical transparent adhesive disposed between the liquid crystal panel and the upmost optical film. This structure not only effectively reduces the light loss, but also increases the light utilization so that the imaging of the liquid crystal panel is clearer.

8 Claims, 1 Drawing Sheet

(51) Int. Cl.
*G02F 1/01* (2006.01)
*F21V 8/00* (2006.01)

(52) U.S. Cl.
CPC ............ *G02F 2001/133317* (2013.01); *G02F 2202/28* (2013.01)

(56) References Cited

U.S. PATENT DOCUMENTS

2008/0304288 A1* 12/2008 Iwasaki ............... F21V 29/02
    362/632
2015/0153607 A1* 6/2015 Chen ............... G02F 1/133308
    349/65

* cited by examiner

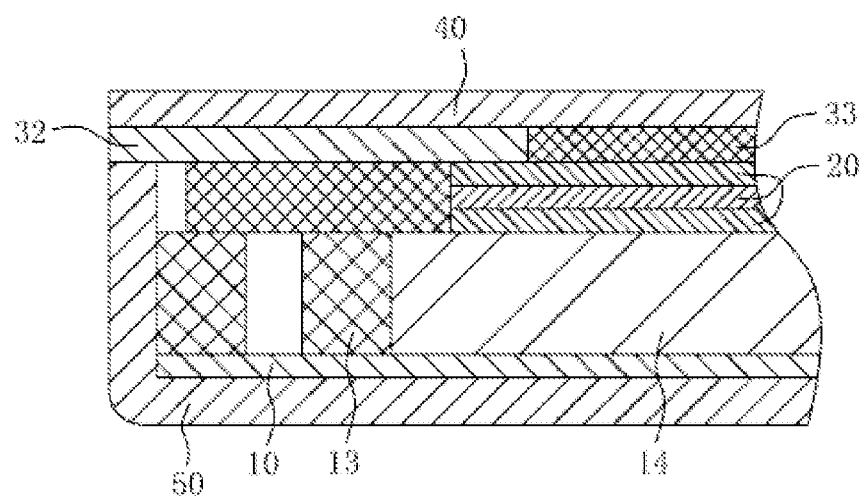

FULL LAMINATION STRUCTURE OF A LIQUID CRYSTAL MOLECULE

BACKGROUND

Technical Field

The disclosure is related to the manufacture and assembly field for a liquid crystal module, and more particular to a full lamination structure of a liquid crystal module.

Related Art

In modern life, a wide range of electronic apparatus, such as LCD TV, LCD PCs, tablet PCs and touch-screen phones, are available for more and more families. In particular, people in their daily lives become increasingly dependent on small electronic products, such as smart touch screen phones and tablet PCs. In the design of the small electronic products, the black double-sided adhesive is usually adopted at the periphery of the backlight module to secure the liquid crystal panel. The black double-sided adhesive and a space layer are disposed between the liquid crystal layer and the optical film. Air exists in the space layer. In the lamination structure, the optical film transmits the light enters into the space layer. The light is propagated in the air and then enters into the liquid crystal panel for imaging. It can be seen that the light propagation in the conventional lamination structure is from a solid substrate to an air, then from the air to another solid substrate. Because the optical film is an optically denser medium and the air is an optical thinner medium, the refraction angle of the light is greater than the incidence angle when the light from the optical film enters into the air during the light propagation. It may refract amount of incident light into the backlight module for losing amount of light.

SUMMARY

The technical problem the disclosure intends to solve is to provide a full lamination structure for a liquid module. The refraction angle of the light is reduced and the light loss is effectively reduced through disposing an optical transparent adhesive between the liquid crystal panel and the optical films to increase the light usage.

In order to achieve the above object, the disclosure adopts the following technical solutions.

A full lamination structure for a liquid crystal module, at least comprises a housing, a liquid crystal panel overlapping on the housing, a light guide plate disposed in the housing, a plurality of optical films disposed in the housing, the plurality of optical films stacked on the light guide plate, and a buffer layer and an optical transparent adhesive disposed between the liquid crystal panel and the upmost optical film.

In one embodiment, the liquid crystal panel is provided with a periphery region and a display region, and the periphery region is located at the two sides of the liquid crystal panel and surrounding the display region.

In one embodiment, the buffer is disposed at the periphery region of the liquid crystal panel, and the optical transparent adhesive is disposed at the display region of the liquid crystal panel.

In one embodiment, the optical transparent adhesive is a double-sided adhesive for adhering the liquid crystal panel and the optical films.

In one embodiment, the optical transparent adhesive is a liquid optical adhesive.

In one embodiment, the optical transparent adhesive is a solid state optical adhesive.

In one embodiment, the light transmittance of the optical transparent adhesive is greater than 99%.

In one embodiment, the material of the buffer layer is a compressible material having seal function.

In one embodiment, the structure further comprises a reflective sheet and a light source, wherein the reflective sheet is under the light guide plate and contacting with the housing, and the light source is at one side of the light guide plate.

In one embodiment, the number of the optical films is three.

Beneficial effects of the disclosure:

In summary, the disclosure provides a full lamination structure for a liquid crystal module. The refraction angle of the light incident into the liquid crystal panel is reduced through disposing an optical transparent adhesive between the liquid crystal panel and the optical films. In the meanwhile, a buffer layer is disposed at the periphery surrounding the optical transparent adhesive to achieve a seamless seal between the liquid crystal panel and the housing. It effectively decreases the light leakage and increases the light incidence rate which from the light source to the liquid crystal panel for enhancing the quality of the image.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which:

FIG. 1 illustrates a partial schematic structure diagram.

DETAILED DESCRIPTION

To illustrate the technical features and the structure of the disclosure in a better way, the following description with reference to the accompanying drawings is provided to explain the exemplary embodiments of the disclosure.

Refer to FIG. 1, a full lamination structure for a liquid module at least comprises a housing 50, a liquid crystal panel 40, a light guide plate 14, a plurality of optical films 20, a reflective sheet 10 and a light source 13 are disposed in the housing 50. The reflective sheet 10 is disposed under the light guide plate 14 and contacts with the housing 50. The light source 13 is disposed on a lateral side of the light guide plate 14. The plurality of the optical films 20 are disposed on the light guide plate 14 and stacked on each other. The liquid crystal panel 40 has a periphery region and a display region. The periphery region is at the two sides of the liquid crystal panel 40 and surrounds the display region. The periphery region is used to secure the liquid crystal panel 40 on the housing 50. The display region is used to display images. In this embodiment, three of the optical films 20 are disposed on the light guide plate 14.

Specifically, a buffer layer 32 and an optical transparent adhesive 33 are disposed between the liquid crystal panel 40 and the upmost optical film 20. The buffer layer 32 is disposed at the periphery region of the liquid crystal panel 40. The material of the buffer layer 32 is a compressible material having seal function, and the buffer layer 32 is disposed between the liquid crystal panel 40 and the housing 50. The optical transparent adhesive 33 is disposed at the display region of the liquid crystal panel 40. The optical transparent adhesive 33 is a double-sided adhesive for adhering the liquid crystal panel 40 and the optical films 20. The optical transparent adhesive 33 is selected from one of a liquid optical adhesive and a solid-state optical adhesive. The light transmittance of the optical transparent adhesive 33 is greater than 99%.

It should be noted that the light transmits from the optical films 20 to the optical transparent adhesive 33 and then the optical transparent adhesive 33 to the liquid crystal panel 40 for imaging. The light is be transmitted from the solid substrate (the optical films 20) to solid substrate (the optical transparent adhesive 33) and then to solid (the crystal panel 40) in the full lamination structure. During the light propagation, because the optical films 20 are optically denser medium, and the optical transparent adhesive 33 is light transmittance medium, the refraction angle of the light is smaller when the light transmits from the optical films 20 to the optical transparent adhesive 33. Morel lights are incident into the liquid crystal panel 40. Thus the light loss is effectively reduced and the light usage is increased. Furthermore, the buffer layer 32 is disposed at the two sides of the optical transparent adhesive 33 to form a seamless seal barrier between the liquid crystal panel 40 and the optical films 20. It effectively prevents the light leakage and increases the light incidence rate from the light source to the liquid crystal panel 40 for enhancing the quality of the image.

In summary, the disclosure provides a full lamination structure for a liquid crystal module. The refraction angle of the light incident into the liquid crystal panel is reduced through disposing an optical transparent adhesive between the liquid crystal panel and the optical films. In the meanwhile, a buffer layer is disposed at the periphery surrounding the optical transparent adhesive to achieve a seamless seal between the liquid crystal panel and the housing. It effectively decreases the light leakage and increases the light incidence rate which from the light source to the liquid crystal panel for enhancing the quality of the image.

The above embodiments of the disclosure are only for clearly explaining the disclosure, and do not intend to limit the disclosure. For those skilled in the art, other variations and modifications may be made on the above basis. It is not necessary to provide all the embodiments herein. Any modifications, equivalent substitution, and improvement should be regarded as within the protection scope of the disclosure as defined by the appended claims.

What is claimed is:

1. A full lamination structure for a liquid crystal module, comprising:
   a housing;
   a liquid crystal panel overlapping on the housing;
   a light guide plate disposed in the housing;
   a plurality of optical films disposed in the housing, the plurality of optical films stacked on the light guide plate; and
   a buffer layer and an optical transparent adhesive disposed between the liquid crystal panel and the upmost optical film and the buffer layer is disposed at the two sides of the optical transparent adhesive;
   wherein the liquid crystal panel is provided with a periphery region and a display region, the periphery region being located at the two sides of the liquid crystal panel and surrounding the display region;
   wherein the buffer is disposed at the periphery region of the liquid crystal panel, and the optical transparent adhesive is disposed at the display region of the liquid crystal panel;
   wherein the buffer layer is disposed at the periphery region of the liquid crystal panel and the housing;
   wherein the material of the buffer layer is a compressible material having seal function.

2. The full lamination structure for a liquid crystal module according to claim 1, wherein the optical transparent adhesive is a double-sided adhesive for adhering the liquid crystal panel and the optical films.

3. The full lamination structure for a liquid crystal module according to claim 2, wherein the optical transparent adhesive is a liquid optical adhesive.

4. The full lamination structure for a liquid crystal module according to claim 3, wherein the light transmittance of the optical transparent adhesive is greater than 99%.

5. The full lamination structure for a liquid crystal module according to claim 2, wherein the optical transparent adhesive is a solid state optical adhesive.

6. The full lamination structure for a liquid crystal module according to claim 5, wherein the light transmittance of the optical transparent adhesive is greater than 99%.

7. The full lamination structure for a liquid crystal module according to claim 1, further comprising a reflective sheet and a light source, the reflective sheet being under the light guide plate and contacting with the housing, the light source being at one side of the light guide plate.

8. The full lamination structure for a liquid crystal module according to claim 1, wherein the number of the optical films is three.

\* \* \* \* \*